(12) United States Patent
Tsuie

(10) Patent No.: US 7,038,731 B2
(45) Date of Patent: May 2, 2006

(54) ADAPTIVE EQUALIZER METHOD AND APPARATUS FOR AMERICAN ATSC SYSTEM

(75) Inventor: Yih-Ming Tsuie, Hsinchu (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 558 days.

(21) Appl. No.: 10/335,893

(22) Filed: Jan. 3, 2003

(65) Prior Publication Data

US 2004/0017516 A1    Jan. 29, 2004

(30) Foreign Application Priority Data

Jul. 24, 2002    (TW) .............................. 91116511 A

(51) Int. Cl.
*H04N 5/21* (2006.01)

(52) U.S. Cl. ..................................... 348/607; 348/614

(58) Field of Classification Search ................ 348/614, 348/607, 624, 725, 728, 914, 470; 375/232, 375/229, 233, 286, 346, 348, 350; H04N 5/21, H04N 5/213
See application file for complete search history.

(56) References Cited

U.S. PATENT DOCUMENTS

| | | | | |
|---|---|---|---|---|
| 5,841,484 A | * | 11/1998 | Hulyalkar et al. | 348/607 |
| 6,011,813 A | * | 1/2000 | Ghosh | 375/233 |
| 6,418,164 B1 | * | 7/2002 | Endres et al. | 375/232 |

FOREIGN PATENT DOCUMENTS

CN    1258166 A    6/2000

* cited by examiner

*Primary Examiner*—Sherrie Hsia

(57) ABSTRACT

An equalization method and device for equalizing the received vestigial sideband (VSB) signal, utilizes segment-sync symbols, Sato directions, erasure slicers, and variable step-sizes. In addition to stop-and-go (SAG) mode, the directions of Sato errors can also be used for speed up the convergence of tap weights of the equalizer. Erasure slicers can mitigate the effect of decision errors as they are passed through the feedback filter. In time-variant environments, variable step-sizes help the equalizer tracking the variations of the channels; in time-invariant environments, variable step-sizes help ease the fluctuations of the steady-state equalizer tap weights, and therefore yield smaller mean-squared-error and better symbol error rate (SER).

26 Claims, 7 Drawing Sheets

ADAPTIVE EQUALIZER METHOD AND APPARATUS FOR AMERICAN ATSC SYSTEM

BACKGROUND OF THE INVENTION

1. Field of Invention

The present invention relates to an equalization method and devices, and more particularly relates to an adaptive blind equalization method and devices to compensate for channel distortion in the 8-level vestigial sideband (8-VSB) high definition television (HDTV) transmission systems.

2. Description of Related Art

The US has adopted the high definition television (HDTV) system proposed by the Grand Alliance (GA), i.e. the American ATSC (Advanced Television Systems Committee) system. For terrestrial broadcast, the GA adopts digital 8-level vestigial sideband (8-VSB) as its modulation method. The corresponding data frame structure is depicted in FIG. 1. Each frame 100 consists of two fields; one field sync segment 102 and three hundred twelve data segments 104 comprise each field. Each segment begins with 4 binary-level symbols (segment sync) 106 having a regular pattern of +5, −5, −5, +5. In a data segment 104, the other eight hundred twenty eight symbols 108 are data symbols resulting from forward error correction (FEC) coding and having values randomly in $\{\pm 1, \pm 3, \pm 5, \pm 7\}$. In the field sync segment 102, the 828 symbols 108 mostly comprise binary $\{\pm 5\}$ pseudo random (PN) sequences which are known to the receiving end. These PN sequences can be used to train the coefficients (tap weights) of the equalizer such that the equalizer can compensate for the intersymbol interference (ISI) caused by the multi-path propagation of the signal.

A simplified TV transmission example is described as follows. A series of images are firstly encoded into a data stream by an encoder. After encoding the series of images, the data stream is then transmitted with a transmitter. In the case of typical TV transmission, a RF transmitter is used for transmitting data, and another RF receiver is utilized for receiving a corresponding data stream. After receiving the data stream, a decoder is used for decoding the data stream. Finally, an image series is restored in the receiver side and shown to people.

Due to obstacles between the transmitter and the receiver, the electromagnetic wave carrying the HDTV data may suffer the so-called multi-path propagation effect. As a result, data transmitted at different times may arrive simultaneously at the receiver. An example of multi-path propagation is shown in FIG. 2. In FIG. 2, a data stream transmitted by the transmitter 202 propagates through some paths designated as "path 1" 212, "path 2" 214, and "path 3" 216 simultaneously. Because "path 1" 212 is longer than "path 2" 214 and "path 3" 216 is shorter than "path 2" 214, some data transmitted at different times are received by a receiver 204 at the same time and these data interfere with one another. Such multi-path propagation of signals causes the so-called inter-symbol interference (ISI).

To solve such problems, an equalizer at the receiving end is necessary to achieve satisfactory HDTV reception. Due to the long delay spread of multi-path channels, the equalizer requires hundreds of coefficients for adequate compensation. Compared with such a large amount of equalizer coefficients, the training sequences are too short for the coefficients to converge within one field sync segment when an adaptive algorithm, for example the least-mean-squared (LMS) algorithm, is used for tap weights adjustment. Therefore, equalizer coefficient adaptation in the data phase is very important to the system performance. The present invention is focused on the tap weight adjustment in the data phase.

SUMMARY OF THE INVENTION

Therefore, one object of the present invention is to provide a flexible yet efficient equalizer adaptive circuit that is suitable for the American ATSC HDTV reception.

An embodiment of the present invention is an adaptive equalizer method for equalizing the received data sequences sequentially. The data symbols in the received sequence are the results of what are emitted from the transmitter and replicas thereof of different times. When equalizing one data sequence, the adaptive method at least includes the following steps.

Firstly, a statistical error value, such as mean square error (MSE), of an equalization result of a previous data sequence is used to determine an adjustment mode when processing the current data sequence.

Secondly, each symbol of the current data sequence is equalized using an equalization filter accompanying a group of coefficients for sequentially equalizing the symbols of the current data sequence. The coefficients of the equalizer are adjusted using update equations corresponding to the determined adjustment mode. With different adjustment mode, there are different update equations. In addition, the statistic error value of the current data sequence is calculated for determining the adjustment mode and other parameters in processing the next data sequence.

These steps are repeated until the end of reception.

With the adaptive method mentioned above, an efficient and effective equalization is provided to meet the needs of high quality data transmission like the high quality television system transmission.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 3:
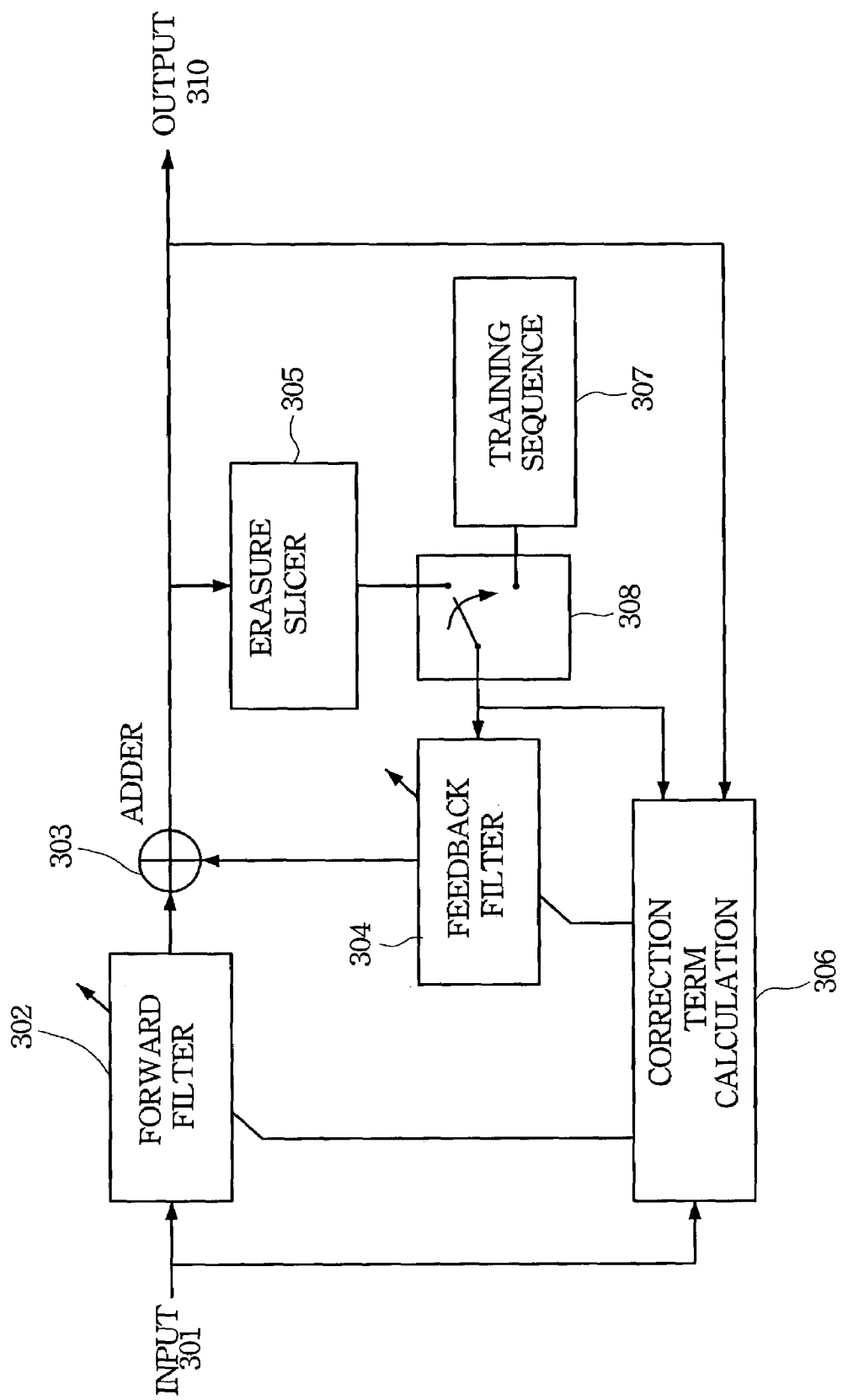
FIG. 3 illustrates an equalizer circuit structure.

An embodiment of the present invention is a set of logic circuits embedded in a decision-feedback equalizer (DFE) for solving inter-symbol interference problems as mentioned above. FIG. 3 is a diagram for illustrating the basic structure of a DFE.

Reference is made to FIG. 3. A DFE is intended for performing channel equalization on an input data stream 301.

The DFE has a forward filter 302, an adder 303, a feedback filter 304, a slicer 305, a correction term calculation 306, a training sequence storage 307, and a selector 308. After equalizing the input data stream 301, an output data stream 310 is obtained.

Figure 1:
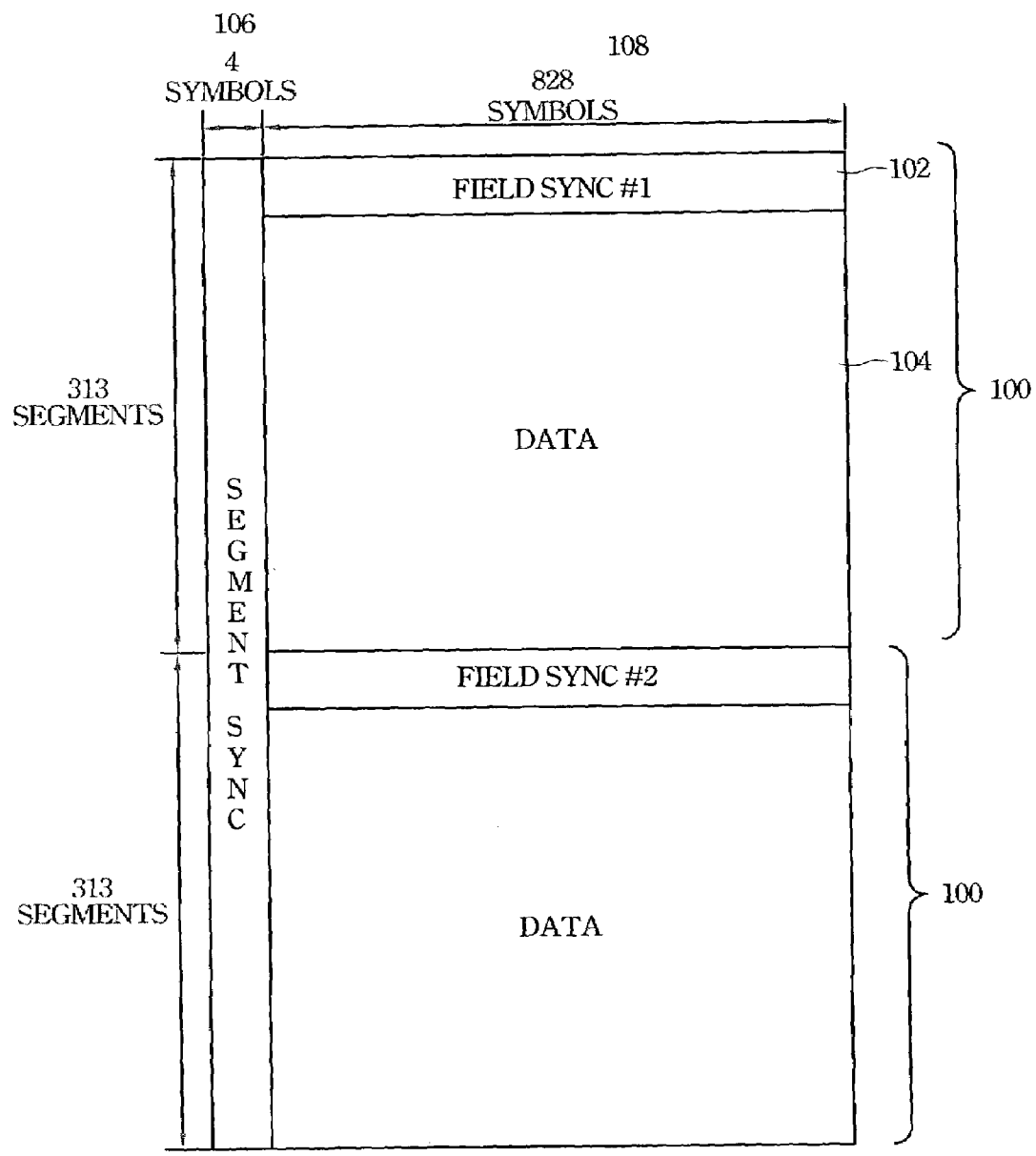
FIG. 1 illustrates a high quality television data stream format.
Figure 2:
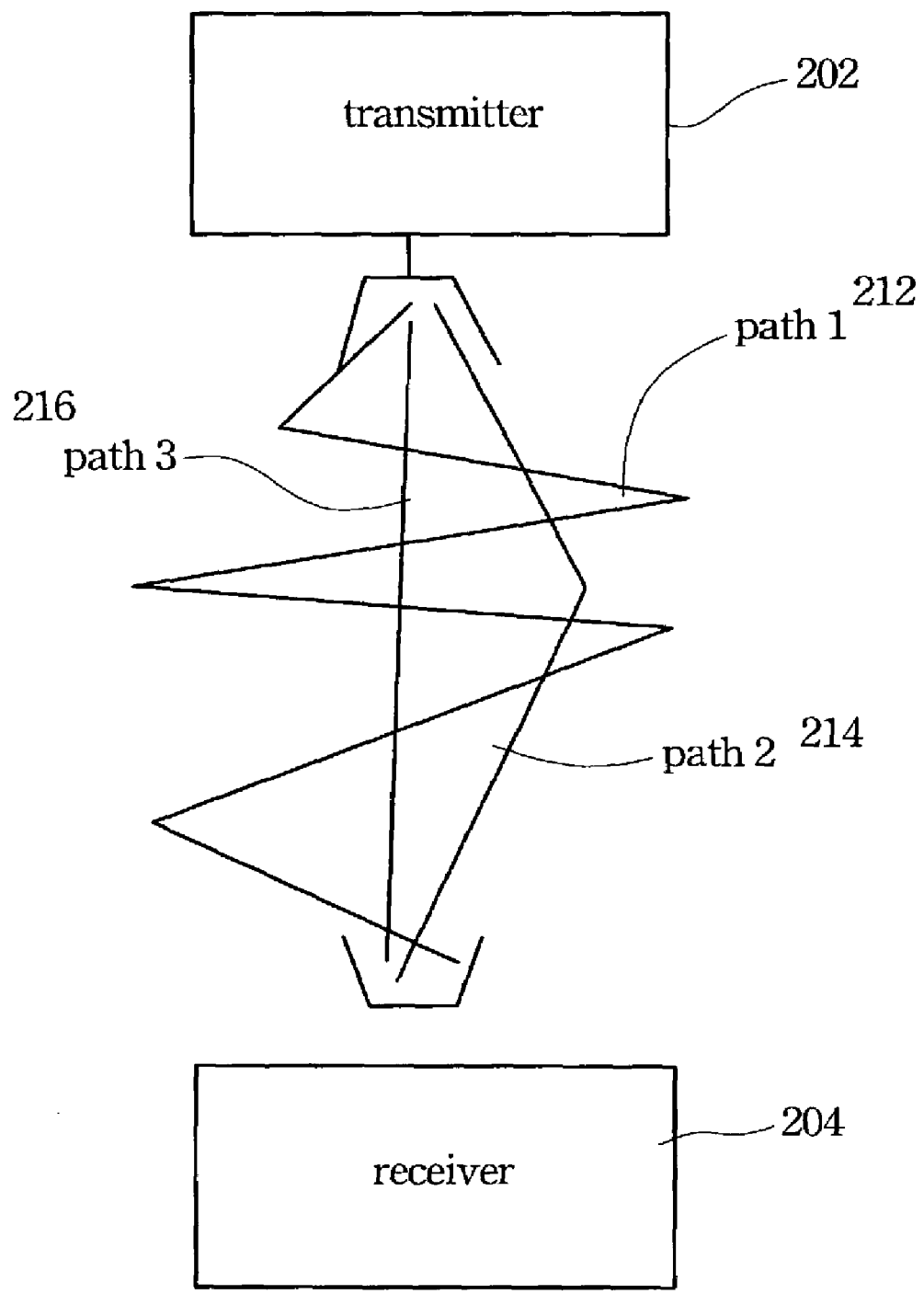
FIG. 2 illustrates an inter-symbol problem through multiple paths.

Typically, two types of inter-symbol interference (ISI) are classified. The first type is called the pre-cursor ISI. Pre-cursor ISI is the interference caused by the symbols transmitted after the current symbol, due to shorter propagation paths (e.g. "path 3" in FIG. 2), on the received current symbol.

The other type is called the post-cursor ISI. In contrast, post-cursor ISI is caused by the symbols, which are transmitted before the current symbol but propagated through longer paths (e.g. "path 1" in FIG. 2), on the received current symbol. Generally speaking, the forward filter 302 is mainly utilized to solve the pre-cursor ISI and the feedback filter 304 is utilized to handle the post-cursor ISI caused by convolution results of channel response coefficients and forward filter coefficients. In a practical example, both the forward filter 302 and the feedback filter 304 are tap-delay-line filters. When processing a current symbol, the equalization filter multiplies a group of coefficients on the received symbols. The filtered results of the forward filter 302 and the feedback filter 304 are added in the adder 303 and then transmitted as the output data stream 310. In addition, the output data stream 310 can be transferred to other modules (e.g. channel decoder) for further processing.

Normally, the equalizer operates in two kinds of situations. The first is called the training phase. In this phase, the receiver knows the correct value of the received data. For example, the receiver has a copy of the input data stored in a storage unit, like the training sequence storage 307. Equalization error values are simply calculated by comparing the equalization results to the correct values of the input data. Then these error values are utilized for adjusting the equalizer coefficients.

After the training phase, the equalizer continues operating on the second phase, called the data phase. In this situation, the receiver has no idea about the original values of the input data, and the receiver needs to estimate the original values for calculating the error values of the equalization. The slicer 305 is used for estimating the original values of input data.

The selector 308 is used for switching input sources of the feedback filter 304. One input source is from the slicer 305, and the other is from the training sequence storage 307. The output of the selector 308 is also supplied to the correction term calculation 306. In the present invention, the correction term calculation 306 is not only used for adjusting the equalizer coefficients, but also used for determining other parameters in the components of the equalizer.

Figure 4:
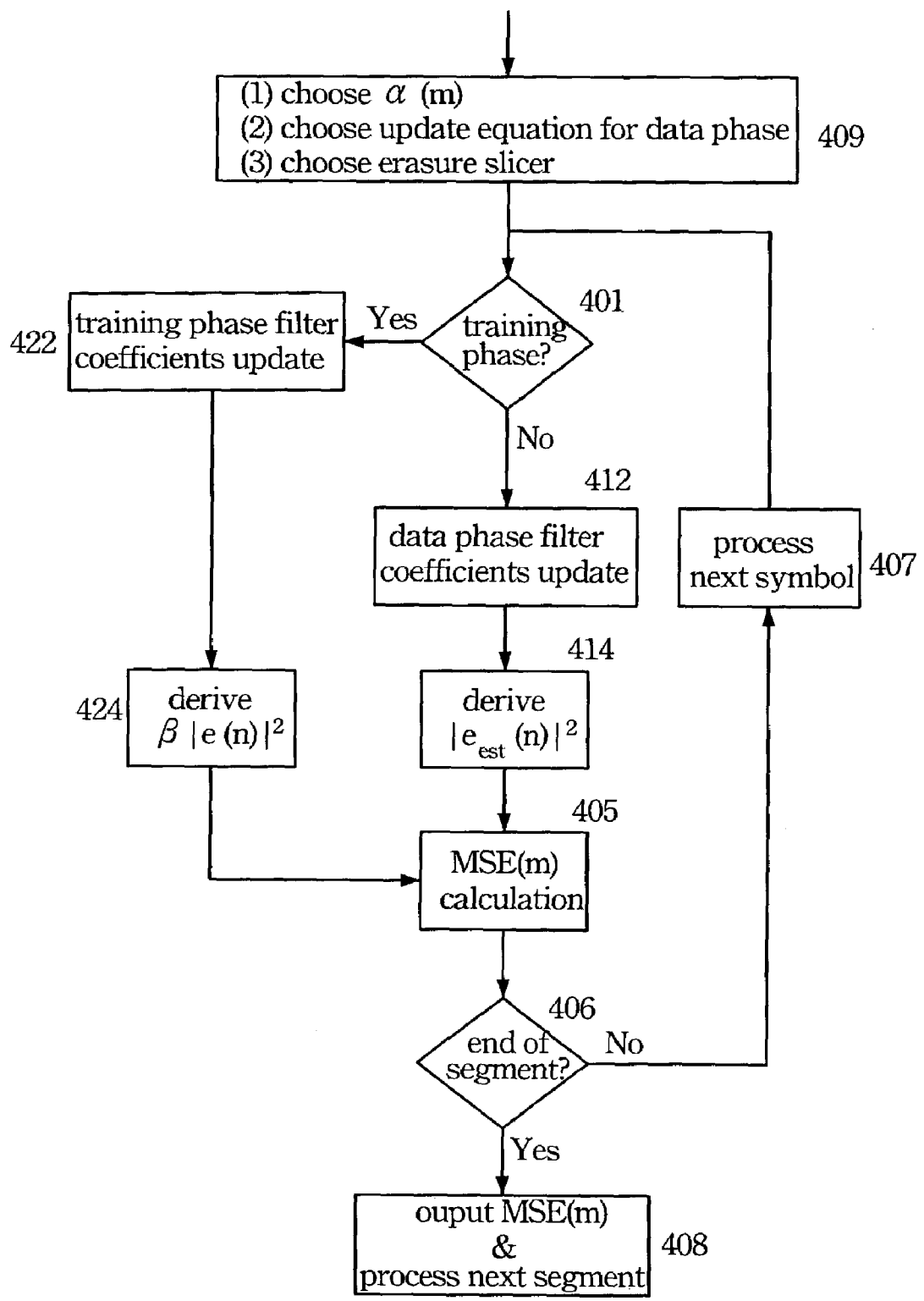
FIG. 4 illustrates a flow chart of the signal processing.
Figure 5:
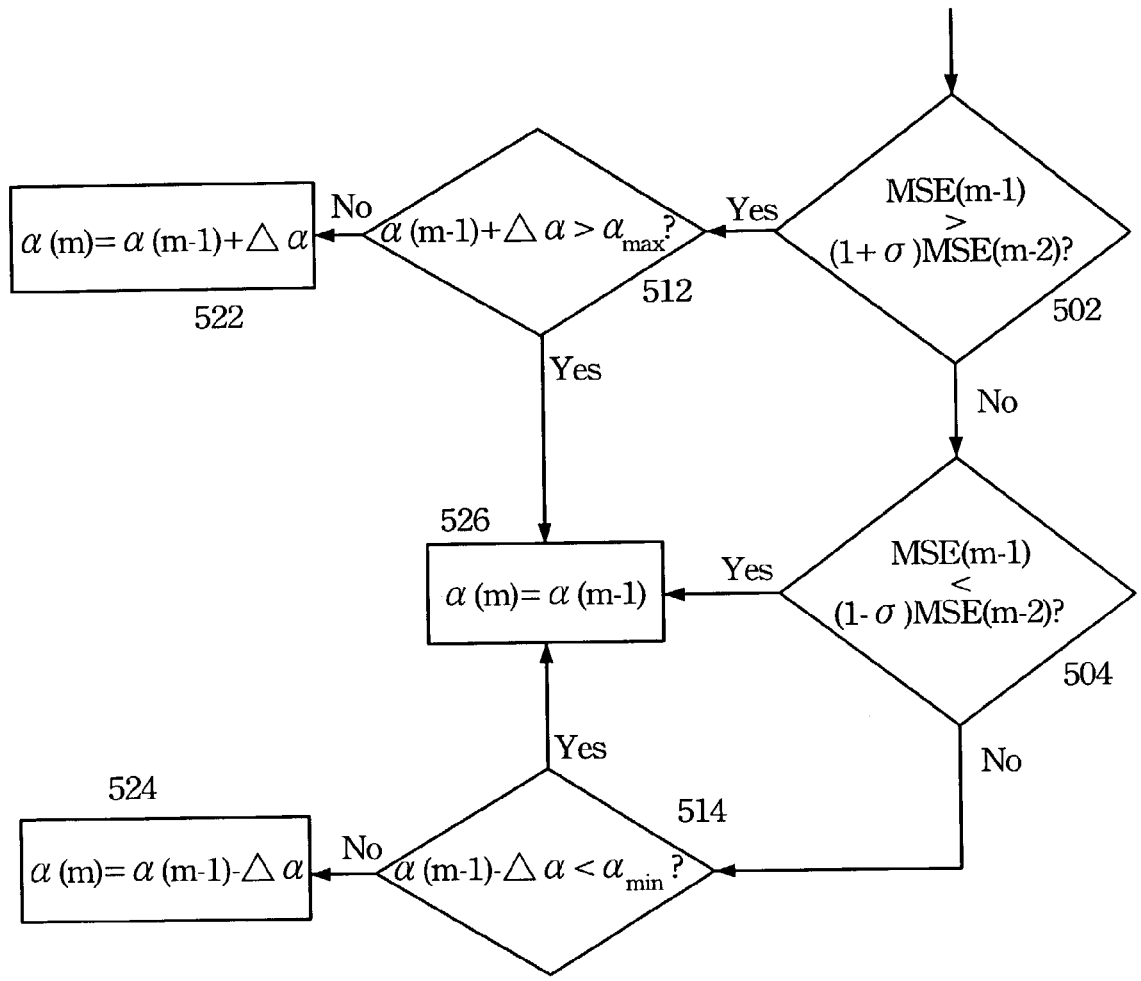
FIG. 5 illustrates a diagram showing the mechanism for variant step sizes.
Figure 6:
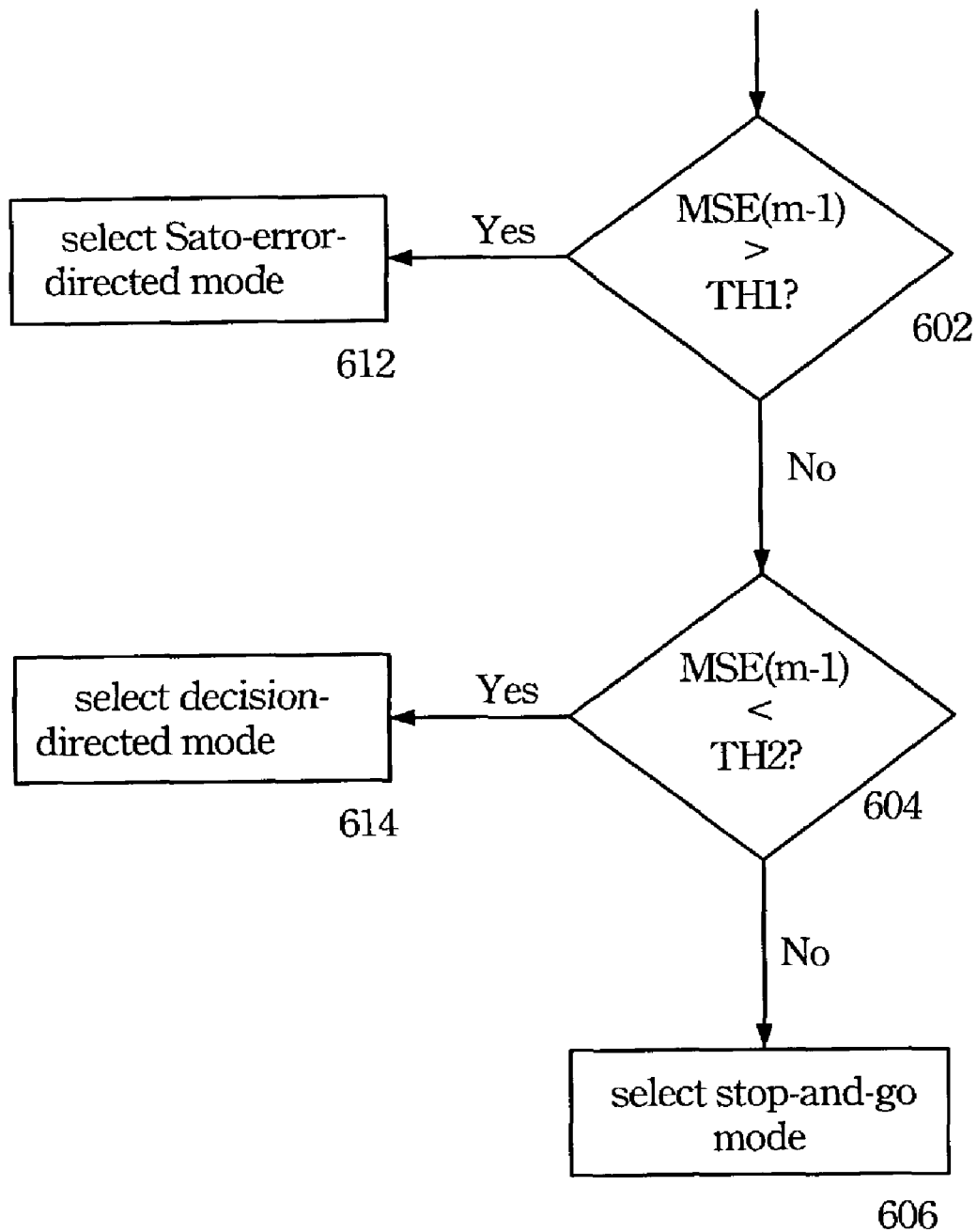
FIG. 6 illustrates a diagram showing different adjustment modes according to one embodiment of the present invention.
Figure 7:
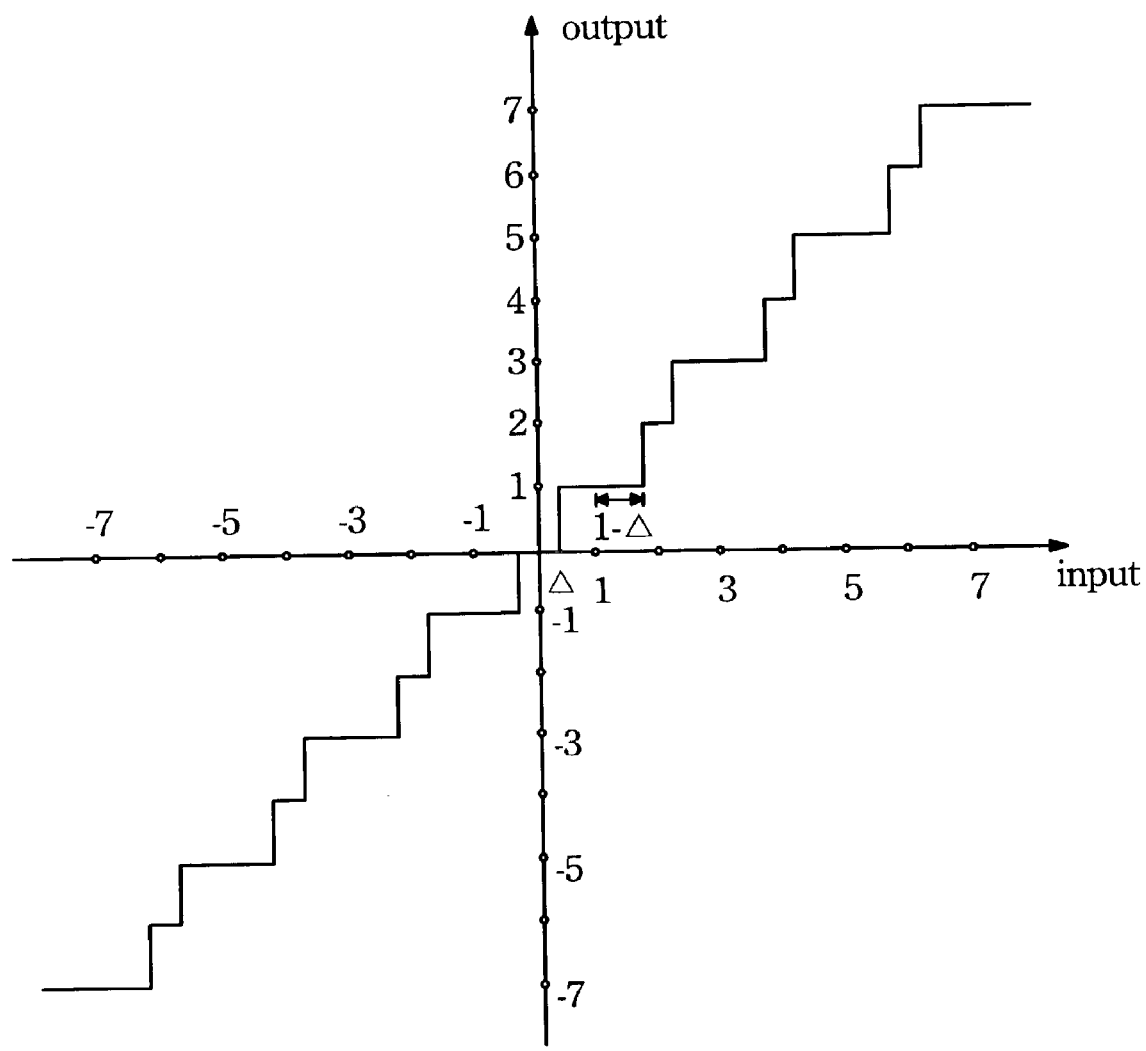
FIG. 7 illustrates a diagram showing a boundary gap in a slicer according to one embodiment of the present invention.

The signal processing flow of the invention is illustrated in FIG. 4. Note that the processing method is segment-based. That is, before processing a new segment (e.g. segment m), the step size $\alpha(m)$ must be chosen, the processing mode and corresponding DFE coefficient update equations in data phase must be determined, and a suitable erasure slicer must be selected. Selection mechanisms for these parameters are shown in FIG. 5 through FIG. 7 and will be detailed in later paragraphs. The selection criterion is based on the estimated mean-squared errors (MSE) derived from the previous segments, which can be used to judge the convergence conditions of the DFE.

The first step of the processing is to determine whether the equalizer operates on the training phase or not (step 401). If yes, the filter coefficients are updated with a group of default settings for the training phase (step 422). After using the updated coefficients to equalize a symbol, $|e(n)|^2$ is derived by comparing the equalization result to the correct value of the input data (step 424). The e(n) is the error value of the nth symbol in the segment. An MSE(m) with error values is calculated (step 405). The MSE(m) is the mean square error of the mth segment in the data stream. After that, if the end of the segment has been reached (step 406), the MSE(m) is output and the next (m+1)th segment is processed (step 408); otherwise the next (n+1)th symbol is processed. As the equalization of segment in the training phase is completed, according to the MSE thereof, $\alpha(m)$ is chosen, the coefficient adjustment equations and erasure slicer for the next segment in the data phase are updated (step 409). Here $\alpha(m)$, data phase coefficient update equations and erasure slicers selected by different ranges of the MSE are further described below. The process returns to step 401, because the process is not in the training phase now, and the filter coefficients are updated with those chosen in step 409 (step 412). Then, similar to the former steps, $|e_{est}(n)|^2$ is derived (step 414) and MSE(m) calculated (step 405). Therefore there is a new MSE of the first segment in data phase, and using it in step 409 to get another new set of $\alpha(m)$, the coefficient update equations and erasure slicer for the second segment in the data phase is updated. These steps are repeated to process all symbols of the total segments sequentially until the whole data stream has been equalized. In the beginning of a next new data stream, the initial segment is in the training phase; thus the same procedures are used to practice the data stream.

The set of these procedures described above may be separately embedded in different elements of a logic circuit. The logic circuit also may be implemented by a combination of digital circuits and analog circuits. All approaches to implement logic circuit known by persons skilled in the art match the spirit of the present invention.

When the DFE is in the training phase, a known sequence is used to train the DFE coefficients according to the LMS algorithm:

$$y(n) = W^T(n) \cdot X(n) \quad (1)$$

$$e(n) = d(n) - y(n) \quad (2)$$

$$W(n+1) = W(n) + \alpha(m) \cdot X(n) \cdot e(n) \quad (3)$$

where W(n) is the coefficient vector of the DFE and comprises the cascade of the forward and feedback tap weights, and n is the time index within the current segment. The superscript T of $W^T(n)$ means transpose. X(n) is the corresponding input vector comprising the contents in the forward and feedback filters. y(n) is the output of the DFE. e(n) is the error signal between the reference signal d(n), which is derived from the known training sequence, and the DFE output y(n). The error signal e(n) and step size $\alpha(m)$ are then combined with the input vector X(n) to form the correction term, shown as the second term on the right-hand side of equation (3), to adjust the coefficients. In the data phase, no known symbols are available. The DFE uses the slicer outputs as the reference signals to adjust the coefficients according to the processing mode determined beforehand by MSE(m-1). The data phase is divided into three processing modes: a Sato-error-directed mode, a stop-and-go mode, and a decision-directed mode. The update equations related to each processing mode are detailed in later paragraphs.

When performing channel equalization on received symbols, the DFE should also estimate the MSE for future segment reference. The MSE is derived from the averaged value of the second moments of the error signals within the current segment. Since the segment-sync symbols are used as the reference signals, each segment contains two kinds of error signals, e(n), derived from equation (2) when the DFE is in the training phase, and $e_{est}(n)$, derived when the DFE is in data phase. To eliminate their difference in second moments, a factor β should be introduced.

After the whole segment of received symbols is processed, the estimated MSE(m) is for selection of the step size, the data phase processing mode, and erasure slicer for the next segment. The resulting DFE parameters at the end of the current segment are also used as the initial settings of the DFE for the next segment.

The reason for adopting the variant step size is two-fold. When the channel varies with time, a larger step size is needed to cope with channel variations. When the channel is fixed, a smaller step size is required for smaller coefficient fluctuations in the steady state. The mechanism for variant step sizes is detailed in FIG. 5. The selection of the step size for the current segment is based on the comparison of the MSEs from the previous two segments. The convergent trends of the DFE can be judged by the MSEs and pre-determined values σ. If MSE(m−1) is larger than (1+σ)MSE(m−2) (step 502), the step-size α(m) for the current data segment will be increased as α (m−1)+Δα (step 522) unless α(m) exceeds a pre-determined maximum value $α_{max}$ (step 512 and step 526). On the other hand, if MSE(m−1) is between (1+σ)MSE(m−2) (step 502) and (1+σ)MSE(m−2) (step 504), then α(m) will be decreased as α(m−1)−Δα (step 524) unless it is lower than a pre-determined minimum value $α_{min}$ (step 514 and step 526).

When MSE(m−1) is larger than (1+σ)MSE(m−2), the DFE is going to lose track of the channel variations, and a larger step size should therefore be set for the DFE to cope with channel variations. When the value of MSE(m−1) is between (1+σ)MSE(m−2) and (1−σ)MSE(m−2), the DFE has achieved its steady state, and a smaller step size is adopted for the current segment for achieving smaller steady state MSE(m). If MSE(m−1) is less than (1−σ)MSE(m−2), the DFE has not yet achieved its steady state, and the same step size for the current segment is therefore used. To prevent instability and an excessively slow convergent speed, the step size is confined by an upper limit $α_{max}$ and a lower limit $α_{max}$ which are determined beforehand.

As described previously, before processing a new segment (e.g. segment m) of received signals, which processing mode should be adopted in the data phase according to MSE(m−1) must be determined. As depicted in FIG. 6, three processing modes can be used for the DFE in the data phase: the Sato-error-directed mode, the stop-and-go mode, and decision-directed mode. When MSE(m−1) is larger than a pre-determined threshold value TH1 (i.e. Yes in step 602), then the DFE is set to Sato-error-directed mode as the data phase of the current segment is entered (step 612). The corresponding coefficient update equations are listed as follows:

$$y(n)=W^T(n)\cdot X(n) \quad (4)$$

$$e_{est}(n)=d_{est}(n)-y(n) \quad (5)$$

$$W(n+1)=W(n)+α(m)\cdot sgn[e_s(n)]\cdot X(n)\cdot |e_{est}(n)| \quad (6)$$

Where y(n), W(n), X(n) and α(m) are as defined above. $d_{est}(n)$ is a temporary decision of the DFE output, i.e. the output of the erasure slicer. $e_s(n)$ is called the Sato error, which can be determined from the following equation:

$$e_s(n)=γsgn[y(n)]-y(n) \quad (7)$$

γ is a constant scalar. sgn[] means the signum function. The Sato-error-directed mode is used to ameliorate the slow convergent speed of the normal stop-and-go mode, but its drawback is larger coefficient variations.

However, if MSE(m−1) is smaller than TH1 but larger than a pre-determined threshold value TH2, that is relatively smaller than TH1 (i.e. No in step 604), the DFE is set to the stop-and-go mode (step 606). The update equations used in the data phase are then:

$$y(n)=W^T(n)\cdot X(n) \quad (8)$$

$$e_{est}(n)=d_{est}(n)-y(n) \quad (9)$$

$$W(n+1)=W(n)+α(m)\cdot s(n)\cdot X(n)\cdot e_{est}(n) \quad (10)$$

Where s(n) equals 1 if the sign of $e_{est}(n)$ is the same as that of $e_s(n)$, and equals 0 otherwise.

When MSE(m−1) is smaller than TH2 (i.e. Yes in step 604), the DFE is set to decision-directed mode as it enters into the data phase (step 614). The corresponding update equations are:

$$y(n)=W^T(n)\cdot X(n) \quad (11)$$

$$e_{est}(n)=d_{est}(n)-y(n) \quad (12)$$

$$W(n+1)=W(n)+α(m)\cdot X(n)\cdot e_{est}(n) \quad (13)$$

The situation corresponds to the case in which the DFE yields a small amount of decision errors.

With such design, the equalization process is more adaptive and takes advantages of different adjusting functions. It is to be noted that three modes are adopted in this example, but the invention is not limited to the use of three modes. Two or more than three modes are possible and match the spirit of the present invention. Also, the function for each mode may be adjusted or replaced with other proper functions.

To mitigate the effect of decision errors on the adjustment of the DFE in its initial blind converging and/or high MSE cases, the erasure slicer is adopted instead of the normal 8-level slicer. That is, the output of the slicer is no longer in {±1, ±3, ±5, ±7}, but rather in {0, ±1, ±2, ±3, ±4, ±5, ±6, ±7}. The input/output relationship of the adopted erasure slicer is shown in FIG. 7. When the MSE (m−1) is larger than a pre-determined threshold value (LV), a larger boundary gap Δ1 is used. Otherwise, a boundary gap size Δ2 is used to prevent unfavorable vibrations during the adjustment of the group of coefficients. Note that Δ1 is larger than Δ2, and LV is a pre-determined value. In the large MSE cases, which usually correspond to high symbol error rate (SER) cases, the normal slicer is apt to make error decisions of the transmitted symbols. Therefore, the erasure slicer with a larger boundary gap Δ1 is adopted. To prevent the counter effects of erasure decisions in small MSE cases, which correspond to a low SER, the erasure slicer with the smaller boundary gap Δ2 is chosen.

FIG. 7 also illustrates the concept of the slicer 305. When the slicer 305 receives an input signal with voltage value between 1−Δ and 1+Δ, it outputs +1 as the signal value. The Δ is called the boundary gap of the slicer 305. When the input signal has a voltage between 1+Δ and 3−Δ, the slicer 305 outputs +2 as the output signal value. Such method is called a "soft decision". Again, a statistical error value is used to adjust the boundary gap Δ.

With the descriptions above, the present invention at least includes the following advantages. First, the present invention easily balances various requirements. For example, in the case of the HDTV equalizer, the number of coefficients referenced by an equalization filter may be over hundreds. With the present invention, both the quality and the speed requirements are achieved. Second, the present invention is flexible because different methods are easily integrated. Third, the present invention is low in cost because calculating a statistical error value, like MSE, is easily implemented.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for equalizing a data sequence in a high definition television system, and the data sequence comprises a plurality of original symbols, the method comprises the steps of:
    equalizing each original symbol of the data sequence with an equalization filter according to a group of parameters to obtain an equalized symbol;
    deriving an error value between the original symbol and the equalized symbol; and
    calculating a statistic error value of the data sequence for choosing a step size, determining an adjustment mode, and selecting a suitable erasure slicer, wherein the step size varies according to a first statistic error value of a data sequence, a second statistic error value of a previous data sequence, a first step size for the data sequence, a second step size for a next data sequence, a predetermined first value, a predetermined second value, a predetermined third value and a predetermined fourth value, wherein
    if the first statistic error value is larger than the second statistic error value multiplied by a value that is the first value plus one and the first step size plus the second value is not larger than the third value, the second step size is set to the first step size plus the second value;
    if the first statistic error value is larger than the second statistic error value multiplied by a value that is the first value plus one and the first step size plus the second value is larger than the third value, the second step size is set to the first step size;
    if the first statistic error value is not larger than the second statistic error value multiplied by a value that is the first value plus one, and the first statistic error value is smaller than the second statistic error value multiplied by a value that is one minus the first value, the second step size is set to the first step size;
    if the first statistic error value is not larger than the second statistic error value multiplied by a value that is the first value plus one, the first statistic error value is not smaller than the second statistic error value multiplied by a value that is one minus the first value, and the first step size minus the second value is not smaller than the fourth value, the second step size is set to the first step size minus the second value; and
    if the first statistic error value is not larger than the second statistic error value multiplied by a value that is the first value plus one, the first statistic error value is not smaller than the second statistic error value multiplied by a value that is one minus the first value, and the first step size minus the second value is smaller than the fourth value, the second step size is set to the first step size.

2. The method of claim 1, wherein the high definition television system includes an American system.

3. The method of claim 1, wherein the error value is obtained from the equalized symbol minus the original symbol.

4. The method of claim 1, wherein the statistic error value is obtained from combining the error values of the original symbols of the data sequence with a mean square error function.

5. The method of claim 1, wherein the data sequences comprise two types of data sequences, first type data sequences contain predetermined data for training and second type data sequences contain non-predetermined data for a user information and a TV program content.

6. The method of claim 1, wherein the adjustment mode is selected from a plurality of candidate modes according to ranges where the statistic error value falls within, each mode comprises functions for adjusting a group of coefficients, and different functions of different modes have different convergence rates.

7. The method of claim 6, wherein the ranges is defined according to a first threshold value and a second threshold value, and the first threshold value is larger than the second threshold value.

8. The method of claim 8, wherein the candidate modes comprise:
    a first mode if the statistic error value is larger than the first threshold value;
    a second mode if the statistic error value is between the first threshold value and the second threshold value; and
    a third mode if the statistic error value is smaller than the second threshold value.

9. The method of claim 8, wherein the first mode comprises:
    getting an output symbol of the equalization filter from an input symbol multiplied by a group of coefficients;
    deriving a first error value from a temporary decision of the output symbol minus the output symbol;
    deriving a second error value from a constant scalar multiplied by a signum function of the output symbol, then minus the output symbol; and
    obtaining a next group of coefficients from the group of coefficients plus the step size multiplied by a signum function of the second error value, the input symbol and an absolute value of the first error value.

10. The method of claim 9, wherein the temporary decision of the equalization output symbol is obtained by the erasure slicer, a first boundary gap is used if the statistic error value is larger than a threshold value, a second boundary gap is used if the statistic error value is not larger than the threshold value, and the first boundary gap is larger than the second boundary gap.

11. The method of claim 8, wherein the second mode comprises:
    getting an output symbol of the equalization filter from an input symbol multiplied by a group of coefficients;
    deriving a first error value from a temporary decision of the equalization output symbol minus the output symbol;
    deriving a second error value from a constant scalar multiplied by a signum function of the input symbol, then minus the input symbol; and
    obtaining a next group of coefficients from the group of coefficients plus the step size multiplied by the input symbol and the first error value if a signum function of the second error value is equal to the signum function of the first error value, otherwise if the signum function of the second error value is not equal to the signum function of the first error value, choosing the next group of coefficients being equal to the group of coefficients.

12. The method of claim 9, wherein the third mode comprises:
   getting an output symbol of the equalization filter from an input symbol multiplied by a group of coefficients;
   deriving an error value from a temporary decision of the equalization output symbol minus the output symbol; and
   obtaining a next group of coefficients from the group of coefficients plus the step size multiplied by the input symbol and the error value.

13. The method of claim 8, wherein the first mode, the second mode and the third mode are used for the second type data sequences, and the candidate modes further comprise a fourth mode used for the first type data sequences, the fourth mode comprises:
   getting an output symbol of the equalization filter from an input symbol multiplied by a group of coefficients;
   deriving an error value from a predetermined value for the input symbol minus the output symbol; and
   obtaining a next group of coefficients from the group of coefficients plus a step size multiplied by the input symbol and the error value, wherein the step size is a predetermined value.

14. A system for equalizing a data sequences in a high definition television system, the data sequence comprises a plurality of original symbols, the system comprises:
   an equalization circuit for equalizing each original symbol of the data sequence with an equalization filter according to a group of parameters to obtain an equalized symbol;
   a processing circuit for deriving an error value between the original symbol and the equalized symbol; and
   a calculating circuit for calculating a statistic error value of the data sequence for choosing a step size, determining an adjustment mode, and selecting a suitable erasure slicer, wherein the step size varies according to a first statistic error value of a previous data sequence, a second statistic error value of a data sequence, a first step size for the data sequence, a second step size for a next data sequence, a predetermined first value, a predetermined second value, a predetermined third value and a predetermined fourth value, wherein
   if the first statistic error value is larger than the second statistic error value multiplied by a value that is the first value plus one and the first step size plus the second value is not larger than the third value, the second step size is set to the first step size plus the second value;
   if the first statistic error value is larger than the second statistic error value multiplied by a value that is the first value plus one and the first step size plus the second value is larger than the third value, the second step size is set to the first step size;
   if the first statistic error value is not larger than the second statistic error value multiplied by a value that is the first value plus one, and the first statistic error value is smaller than the second statistic error value multiplied by a value that is one minus the first value, the second step size is set to the first step size;
   if the first statistic error value is not larger than the second statistic error value multiplied by a value that is the first value plus one, the first statistic error value is not smaller than the second statistic error value multiplied by a value that is one minus the first value, and the first step size minus the second value is not smaller than the fourth value, the second step size is set to the first step size minus the second value; and
   if the first statistic error value is not larger than the second statistic error value multiplied by a value that is the first value plus one, the first statistic error value is not smaller than the second statistic error value multiplied by a value that is one minus the first value, and the first step size minus the second value is smaller than the fourth value, the second step size is set to the first step size.

15. The system of claim 14, wherein the high definition television system includes an American system.

16. The system of claim 14, wherein the error value is obtained from the equalized symbol minus the original symbol.

17. The system of claim 14, wherein the statistic error value is obtained from combining the error values of the original symbols of the data sequence with a mean square error function.

18. The system of claim 14, wherein the data sequences comprise two types of data sequences, first type data sequences contain predetermined data for training and second type data sequences contain non-predetermined data for a user information and a TV program content.

19. The system of claim 14, wherein the adjustment mode is selected from a plurality of candidate modes according to ranges where the statistic error value falls within, each mode comprises functions for adjusting a group of coefficients, and different functions of different modes have different convergence rates.

20. The system of claim 19, wherein the ranges is defined according to a first threshold value and a second threshold value, and the first threshold value is larger than the second threshold value.

21. The system of claim 20, wherein the candidate modes comprise:
   a first mode if the statistic error value is larger than the first threshold value;
   a second mode if the statistic error value is between the first threshold value and the second threshold value; and
   a third mode if the statistic error value is smaller than the second threshold value.

22. The system of claim 21, wherein the first mode is decided by
   getting an output symbol of the equalization filter from an input symbol multiplied by a group of coefficients;
   deriving a first error value from a temporary decision of the output symbol minus the output symbol;
   deriving a second error value from a constant scalar multiplied by a signum function of the output symbol, then minus the output symbol; and
   obtaining a next group of coefficients from the group of coefficients plus the step size multiplied by a signum function of the second error value, the input symbol and an absolute value of the first error value.

23. The system of claim 22, wherein the temporary decision of the output symbol is obtained by the erasure slicer, a first boundary gap is used if the statistic error value is larger than a threshold value, a second boundary gap is used if the statistic error value is not larger than the threshold value, and the first boundary gap is larger than the second boundary gap.

24. The system of claim 21, wherein the second mode is decided by
   getting an output symbol of the equalization filter from an input symbol multiplied by a group of coefficients;

deriving a first error value from a temporary decision of the output symbol minus the output symbol;

deriving a second error value from a constant scalar multiplied by a signum function of the input symbol, then minus the input symbol; and obtaining a next group of coefficients from the group of coefficients plus the step size multiplied by the input symbol and the first error value if a signum function of the second error value is equal to the signum function of the first error value, otherwise if the signum function of the second error value is not equal to the signum function of the first error value, choosing the next group of coefficients being equal to the group of coefficients.

25. The system of claim 21, wherein the third mode is decided by getting an output symbol of the equalization filter from an input symbol multiplied by a group of coefficients;

deriving an error value from a temporary decision of the output symbol minus the output symbol; and obtaining a next group of coefficients from the group of coefficients plus the step size multiplied by the input symbol and the error value.

26. The candidate modes of claim 21, wherein the first mode, the second mode and the third mode are used for the second type data sequences, and the candidate modes further comprise a fourth mode used for the first type data sequences, the fourth mode is decided by getting an output symbol of the equalization filter from an input symbol multiplied by a group of coefficients;

deriving an error value from a predetermined value for the input symbol minus the output symbol; and obtaining a next group of coefficients from the group of coefficients plus a step size multiplied by the input symbol and the error value, wherein the step size is a predetermined value.

* * * * *